(12) United States Patent
Kobayashi et al.

(10) Patent No.: US 8,509,505 B2
(45) Date of Patent: Aug. 13, 2013

(54) IMAGE DISPLAY DEVICE AND X-RAY CT DEVICE

(75) Inventors: Hideaki Kobayashi, Otawara (JP); Hitoshi Yamagata, Otawara (JP)

(73) Assignees: Kabushiki Kaisha Toshiba, Tokyo (JP); Toshiba Medical Systems Corporation, Tochigi-Ken (JP)

( * ) Notice: Subject to any disclaimer, the term of this patent is extended or adjusted under 35 U.S.C. 154(b) by 863 days.

(21) Appl. No.: 12/627,218

(22) Filed: Nov. 30, 2009

(65) Prior Publication Data

US 2010/0135555 A1    Jun. 3, 2010

(30) Foreign Application Priority Data

Dec. 3, 2008 (JP) ................................. 2008-309047

(51) Int. Cl.
*G06K 9/00* (2006.01)
(52) U.S. Cl.
USPC ............................................................ 382/128
(58) Field of Classification Search
USPC ............................................................ 382/128
See application file for complete search history.

(56) References Cited

U.S. PATENT DOCUMENTS

| | | | |
|---|---|---|---|
| 6,993,175 B2* | 1/2006 | Samoszuk et al. ............ 382/133 |
| 2005/0065425 A1 | 3/2005 | Matsumoto | |
| 2005/0245803 A1* | 11/2005 | Glenn, Jr. et al. ............. 600/407 |
| 2006/0239529 A1* | 10/2006 | Kuth et al. ..................... 382/130 |
| 2008/0004543 A1* | 1/2008 | Davies .......................... 600/547 |

FOREIGN PATENT DOCUMENTS

| | | |
|---|---|---|
| JP | 2000-51207 A | 2/2000 |
| JP | 2005-87602 A | 4/2005 |
| JP | 2007-175271 A | 7/2007 |

OTHER PUBLICATIONS

Japanese Office Action with English Summary for Japanese Patent Application No. 2008-309047 mailed on Apr. 23, 2013.

* cited by examiner

*Primary Examiner* — Gerald J. O'Connor
*Assistant Examiner* — Trang Nguyen
(74) *Attorney, Agent, or Firm* — Yoshida & Associates, LLC

(57) ABSTRACT

Normal region with inner wall of a lumen estimated to be normal is searched; in the normal region, a standard depth position is obtained along with the phased depth positions; a determination is made as to whether the pixel values of image data related to the phased depth positions are the pixel values of a tumor region estimated to be a tumor; when the pixel values are those of the tumor region, the deepest depth position of the tumor region is searched at each position of the inner wall of the lumen; the tumor region at each position of the inner wall of the lumen is identified for each of the deepest depth positions of the tumor region based on the tumor region searched at each position of the inner wall of the lumen and on information on the deepest depth positions of the tumor region.

11 Claims, 9 Drawing Sheets easily understandable case:

[display example]

not easily understandable case:

[display example]

IMAGE DISPLAY DEVICE AND X-RAY CT DEVICE

BACKGROUND OF THE INVENTION

1. Field of the Invention

This invention relates to an image display device and an X-ray CT device.

This invention particularly relates to an image display device and an X-ray CT device used for performing a preoperative diagnosis of a lumen by displaying a three-dimensional image of the lumen of an intestine, a stomach, or the like.

2. Description of the Related Art

Studies regarding the application of, for example, three-dimensional imaging of the large intestine using CT (computed tomography)—a process referred to as CTC (CT Colonography)—for colorectal cancer screening have been conducted since the age of single-slice helical CT technology. Advancements in multidetector-row CT have intensified these studies of such applications, and in recent years, efforts have been made to establish a clinically applicable large-intestine analysis system for preoperative diagnoses.

Examples of image displays used for the CTC described above include virtual endoscopy (VE), virtual gross pathology (VGP), volume rendering (VR), and multi planar reformat (MPR).

In relation to the image display technologies described above, a radial projection process is implemented about an approximate center line of the stomach to generate an expanded projected image, wherein during the projection process, the projection process is ended at the posterior border of the connective area of the stomach wall, a projected diagram (VGP) is generated with the vertical axis as the circumferential angle around the central axis and the horizontal axis as the longitudinal position of the center line, and a display oriented along the stomach wall surface is superimposed and displayed with a notified region in the displayed projected diagram. In the process for generating the expanded projected image, first, the detailed irregular structure of the stomach wall surface is analyzed, a region (notified region) that may include abnormalities is identified, a determination is made as to which image of a partial projected image as described above is to be superimposed by the identified region, and an image superimposed with a graphic indicating the partial projected image and the notified region is displayed (e.g., Japanese published unexamined application 2007-175271).

However, as described below, in screening tests, it may be difficult to observe the presence or properties of a tumor or the degree of invasion of a tumor only by image displays such as the virtual endoscopy (VE) display and virtual gross pathology (VGP) display described above. In a VE display, when the viewing direction runs counter to the orientation of the tumor (direction of prominence), the tumor is observed from directly overhead and it is difficult to determine the size (conditions of the prominence from the inner wall surface) of the tumor. Moreover, even when a MPR image is combined and displayed to be observed over the VE display, it becomes difficult to differentiate the tumor from the inner wall surface and it remains difficult to determine the degree of invasion.

Therefore, when the viewing direction runs counter to the orientation of the tumor (direction of prominence), it is necessary to shift the viewing position or the viewing direction from the current observation position to set the orientation of the tumor in a direction perpendicular to the viewing direction.

An explanatory diagram, an example display of a VE image, and an example composite display of a VE image and an MPR image, each illustrating a case in which the orientation of the tumor is perpendicular to the viewing direction, are shown on the left side, center, and right side, respectively, of FIG. 9. Moreover, an explanatory diagram, an example display of a VE image, and an example composite display of a VE image and an MPR image, each illustrating a case in which the orientation of the tumor runs counter to the viewing direction, are shown on the left side, center, and right side, respectively, of FIG. 10.

While a VGP display is essential for a screening test as it allows the interior of the large intestine to be observed as a whole, the crescentic haustra of the inner wall of the large intestine and the tumor can only be discriminated based on the irregular configurations, and there is a problem in that it is difficult to determine the properties or the degree of invasion of the tumor.

Similarly, in the image display technology described in the above patent document, the notified region can only be discriminated based on the irregular configurations, and there is a problem in that it is difficult to determine the properties or the degree of invasion of the notified region.

SUMMARY OF THE INVENTION

This invention has been devised to resolve the above problems, and the purpose thereof is to provide an image display device and an image display method that allow for the properties and the degree of invasion of a tumor to be easily determined and that enable preoperative diagnoses including more efficient screening tests to be performed.

The first illustrative embodiment of this invention is an image display device comprising: a storage section configured to store three-dimensional image data including a lumen; a tumor-region search section configured to detect a tumor region in the lumen; a depth-information search section configured to determine the depth information of the tumor region in the wall of the lumen; a display section; and a display controller configured to cause the display section to display the depth information along with an image of the lumen.

According to this first illustrative embodiment, it is possible to easily determine the properties and the degree of invasion of a tumor and to perform preoperative diagnoses including more efficient screening tests to be performed.

Moreover, the second illustrative embodiment of this invention is the image display device described in the first illustrative embodiment, wherein: the tumor-region search section comprises a first search section configured to search for a normal region from the pixel values of the image data of the region including the lumen, based on the pixel values of the normal region where an inner wall of the lumen is estimated to be normal at respective positions of the inner wall of the lumen; the depth-information search section comprises a depth calculation section configured to determine a standard depth position, which is a position at a predetermined depth in the direction toward the outer wall of the lumen from the inner wall surface of the lumen, and to determine the phased depth positions when the depth from the standard depth position to the position of the outer wall of the lumen is increased in phases at a predetermined interval; the tumor-region search section further comprises a second search section configured to receive information of the phased depth information from the depth calculation section, to determine whether the pixel values of the image data related to each of the phased depth positions are the pixel values of the tumor region estimated to be a tumor, and, based on the determination that the pixel values are those of the tumor region, to search for the deepest depth position of the tumor region at each position of the inner wall of the lumen; and the display controller causes, based on the tumor region searched at each position of the inner wall of the lumen and on information on the deepest depth positions of the tumor region, the tumor region at each position of the inner wall of the lumen to be identified for each of the deepest depth positions of the tumor region, and causes the tumor region to be superimposed on an image of the lumen to be displayed on the display section.

According to this second illustrative embodiment of the invention, it is possible to easily determine the properties and the degree of invasion of a tumor by using an expanded image display allowing the lumen interior to be observed as a whole.

The third illustrative embodiment of this invention is an image display device related to the first or second illustrative embodiment, wherein: the image of the lumen is an expanded image in which the inner wall of the lumen is planarly expanded; and the display controller is configured to cause the tumor region to be superimposed on the expanded image and displayed.

The fourth illustrative embodiment of this invention is an image display device related to the second or third illustrative embodiment, wherein: the depth calculation section comprises an interval adjustment section configured to change the predetermined interval.

The fifth illustrative embodiment of this invention is an image display device related to any of the first to fourth illustrative embodiments, wherein the display controller is configured to cause the image of the tumor region at each of the deepest depth positions to be identified according to color.

The sixth illustrative embodiment of this invention is the image display device described in the first or second illustrative embodiment, wherein a medical imaging device that collects the image data is either an X-ray CT device or an MRI device.

The seventh illustrative embodiment of this invention is an X-ray CT device comprising the image display device described in the first or second illustrative embodiment, The eighth illustrative embodiment of this invention is an image display method comprising: generating data of an expanded image in which the inner wall of the lumen is planarly expanded, based on image data of a region including a lumen; searching for the normal region from the pixel values of the data of the expanded image at a planar position of the inner wall of the lumen, based on the pixel values of a normal region where the inner wall of the lumen is estimated to be normal; determining a standard depth position, which is a position at a predetermined depth in the direction toward the outer wall of the lumen from the inner wall surface of the lumen, and determining the phased depth positions when the depth from the standard depth position to the position of the outer wall of the lumen is increased in multiple phases at a predetermined interval; receiving information on the phased depth positions for each planar position of the inner wall of the lumen, starting a search for the phased depth positions in order from the standard depth position, and, if the phased depth position is equal to or below the position of the outer wall of the lumen, determining whether the pixel values of the data of the expanded image related to the phased depth position are the pixel values of a tumor region estimated to be a tumor and defining the current phased depth position as the deepest depth position of the tumor region when the pixel values are determined to be those of the tumor region, or, if the phased depth position exceeds the position of the outer wall of the lumen, ending the search for the deepest depth position; and identifying the tumor region at each planar position of the inner wall of the lumen for each of the deepest depth positions of the tumor region, and superimposing the tumor region on the expanded image to be displayed, based on the tumor region searched at each planar position of the inner wall of the lumen and on information on the deepest depth positions of the tumor region.

The ninth illustrative embodiment of this invention is an image display method related to the eighth illustrative embodiment, the image of the lumen is an expanded image in which the inner wall of the lumen is planarly expanded; and during the superimposing, the tumor region is superimposed on the expanded image to be displayed.

The tenth illustrative embodiment of this invention is an image display method related to the eighth or ninth illustrative embodiment, comprising changing the predetermined interval using an interval adjustment section.

The eleventh illustrative embodiment of this invention is an image display method related to any of the eighth to tenth illustrative embodiments, wherein the image of the tumor region at each of the deepest depth positions is identified according to color.

DETAILED DESCRIPTION OF THE EMBODIMENTS (Composition)

Figure 1:
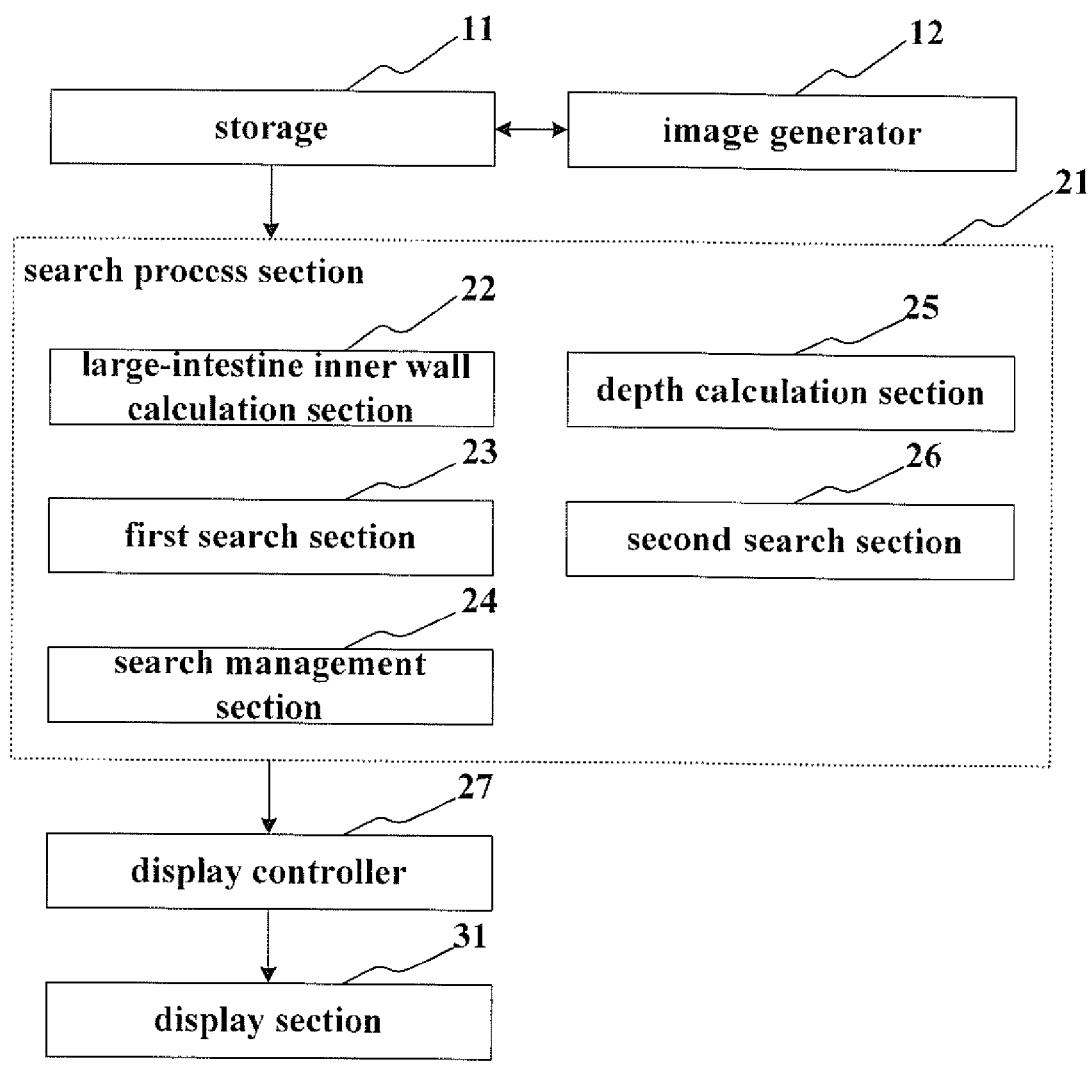
FIG. 1 is a block diagram showing the configuration of an image display device related to one illustrative embodiment of this invention.
Figure 2:
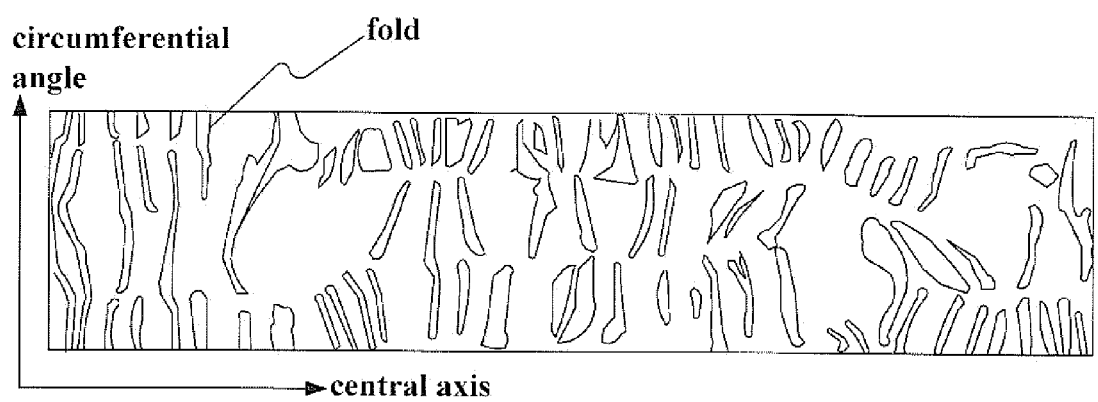
FIG. 2 is an explanatory diagram of an expanded image.
Figure 3:
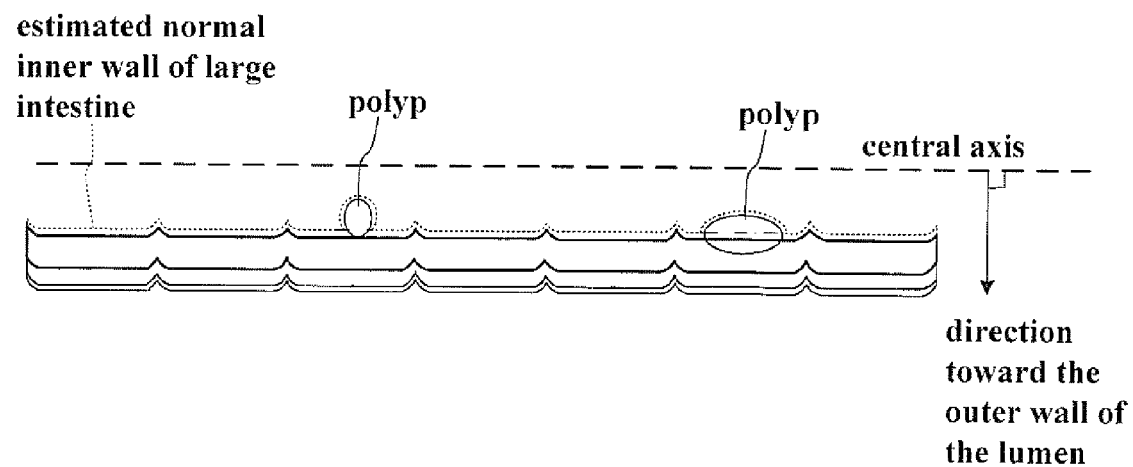
FIG. 3 is an explanatory diagram of the process of calculating a standard depth.

A device related to an exemplary embodiment of this invention will now be described with reference to the drawings. FIG. 1 is a block diagram showing the configuration of an image display device; FIG. 2 is an explanatory diagram of an expanded image; FIG. 3 is an explanatory diagram of the process of calculating the planar position information of a normal region; and FIG. 4 is an explanatory diagram of the process of calculating a standard depth position and phased depth positions.

A storage 11 stores three-dimensional image data of a region including a large intestine, the data collected by an X-ray CT device not shown in the diagram.

An image generator 12 generates, based on the three-dimensional image data, an expanded image (VGP image) in which the values of a projection process performed radially from the central axis of the large intestine are distributed with the circumferential angle around the central axis as the vertical axis and the position on the central axis as the horizontal axis. FIG. 2 illustrates an expanded image. The expanded image is an image in which the inner wall of the large intestine is planarly expanded, wherein a single image displays all of the regions of the inner wall of the large intestine, with the effect that it becomes easier to search for a tumor region.

A search process section 21 comprises: a large-intestine inner-wall calculation section 22 for generating, based on the three-dimensional image data and the data of the expanded image, information enabling the properties and the degree of invasion of a tumor to be easily determined; a first search section 23; a search management section 24; a depth calculation section 25, and a second search section 26. Each section from the large-intestine inner-wall calculation section 22 to the second search section 26 may be set independently, or a plurality of the sections may be combined to form the whole or part of the search process section 21.

The large-intestine inner-wall calculation section 22 extracts regions of air in the large intestine through a segmentation process based on the data of the expanded image and calculates the planar position information of the inner wall of the large intestine from the contour information. The large-intestine inner-wall calculation section 22 sends the planar position information of the inner wall of the large intestine to the first search section 23.

The first search section 23 receives the planar position information of the inner wall of the large intestine and calculates, based on the CT values of a normal region estimated to be normal, the planar position information of the normal region from the CT values, which are the pixel values of the planar position information of the inner wall of the large intestine. The first search section 23 sends the planar position information of the normal region to the search management section 24. In addition, the first search section 23 is also capable of calculating, based on the CT values of a tumor region estimated to be a tumor, the planar position information of the tumor region. In this case, the first search section 23 corresponds to a tumor-region search section that detects tumor regions in a lumen.

Figure 4A:
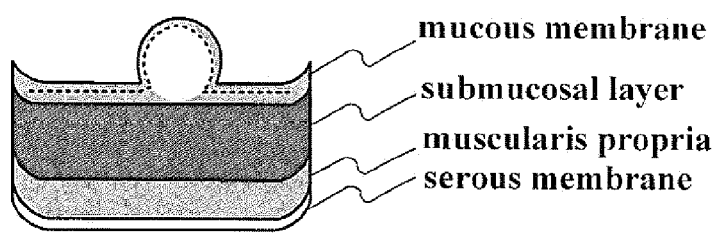
FIG. 4 is an explanatory diagram of the process of obtaining phased depth positions.
Figure 4B:
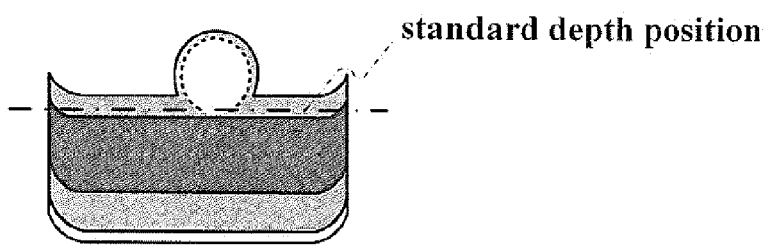
Figure 4C:
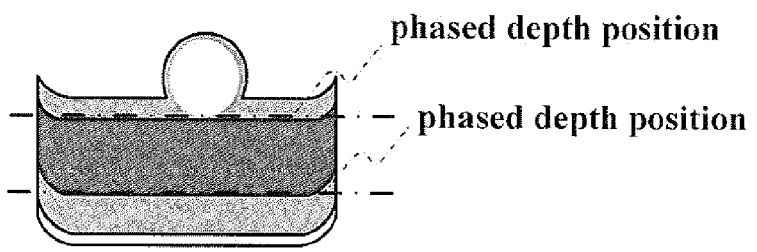

Next, calculation of the position information of a normal region in the inner wall of a large intestine will be described with reference to FIGS. 3 and 4. The first search section 23 calculates the CT values of a position (in the mucous membrane) of 0.25 mm from the inner wall surface toward the outer wall based on the inner-wall information of the large intestine. The presence or absence of any polyps is determined based on this CT values, making it possible to estimate a normal region by connecting adjacent regions where no tumor has been generated. An estimated normal inner wall of the large intestine, a polyp, and a central axis are each shown in FIG. 3. FIG. 4a illustrates a depth position at a predetermined distance (0.25 mm) from the surface of the inner wall of the large intestine to the outer wall of the large intestine. The depth calculation section 25 obtains a standard depth position. FIG. 4b illustrates a standard depth position, which is a depth position at said predetermined distance (0.25 mm). Moreover, the depth calculation section 25 obtains phased depth positions when the depth from the standard depth position toward the outer wall of the large intestine is increased in phases at a predetermined interval. FIG. 4c illustrates a standard depth position with a depth increased at a predetermined interval.

The depth calculation section 25 receives inputs from an operation section (not shown in the figures) such as a pointing device and includes an interval adjustment section that changes the predetermined interval. As described below, by providing the interval adjustment section, the phased depth positions may be set at the depth positions of each layer of the wall of the large intestine. Moreover, generally, by widening the predetermined interval using the interval adjustment section, the properties and the degree of invasion of the lesioned part may be understood more quickly. By narrowing the predetermined interval using the interval adjustment section, the properties and the degree of invasion of the lesioned part may be understood more accurately. Moreover, it also becomes possible to adjust the predetermined interval for screening tests for lumen walls with different wall thicknesses.

Figure 5:
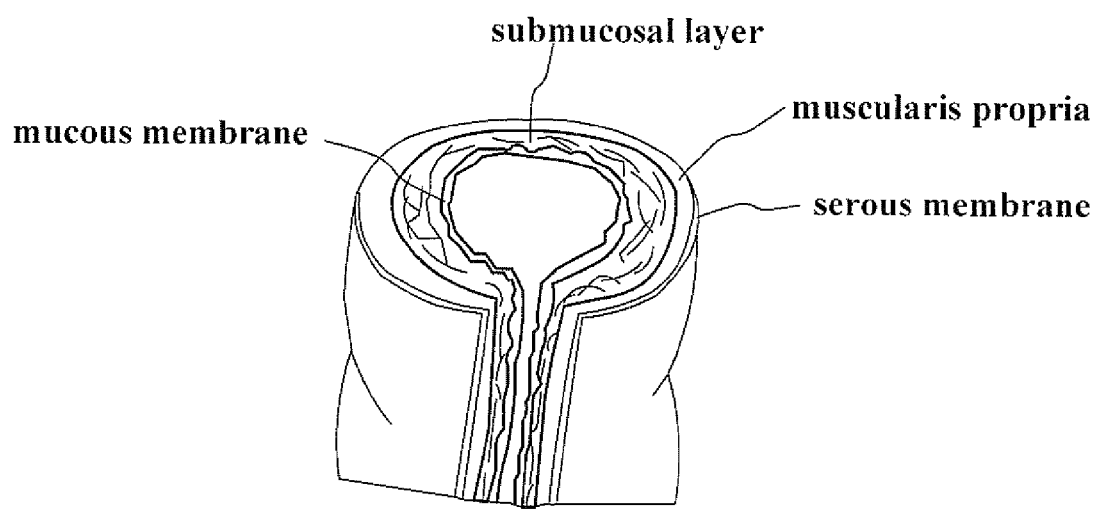
FIG. 5 is a diagram showing the structure of the wall of a large intestine.
Figure 6:
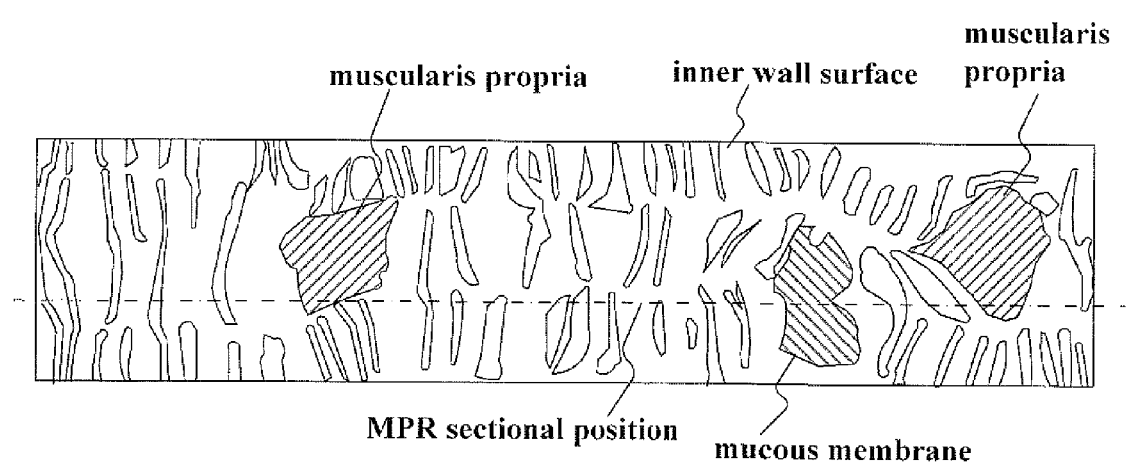
FIG. 6 is a diagram of an expanded image and a tumor region displayed by being superimposed on the expanded image.

Now, the structure of the wall of a large intestine, the standard depth position, and the phased depth positions will be described with reference to FIGS. 3-5. FIG. 5 is a diagram showing the structure of the wall of a large intestine and FIG. 6 is a diagram explaining an expanded image and a tumor region displayed by being superimposed on the expanded image.

The wall of a large intestine is composed of 4 layers. FIG. 5 illustrates each layer from the surface of the inner wall of the large intestine toward the outer wall, respectively known (in order) as the mucous membrane, the submucosal layer, the muscularis propria, and the serous membrane. To briefly describe each layer, the mucous membrane is where tumors or cancers occur. The amount of blood and lymphatic vessels increases in the submucosal layer, and if a cancer progresses to this depth, there is a possibility of metastasis. The muscularis propria is where leiomyomas, leiomyosarcomas, etc. occur.

If a cancer progresses beyond the serous membrane, it metastasizes to the peritoneum or invades the surrounding organs.

As described above, tumors occur in the mucous membrane layer, which is the closest layer to the surface of the inner wall of the large intestine, and therefore, by calculating the CT values of the interior (mucous membrane layer) of the wall of the large intestine, a determination may be made as to whether a tumor has been generated in the large intestine. The depth position of the mucous membrane layer is defined as the standard depth position, and based on the CT values of the standard depth position, a determination is made as to whether they are the CT values of a tumor region.

Moreover, by fixing the predetermined interval to 0.25 mm, for example, the phased depth positions may be set to the depth positions of each layer of the mucous membrane, the submucosal layer, the muscularis propria, and the serous membrane.

The actual thickness of the wall of the large intestine is several millimeters, and it is difficult to differentiate the borders of each layer by determining the CT values using the spatial resolution of current X-ray CT devices. However, even in this case, based on the depth position from the inner wall surface toward the outer wall, it is possible to identify (color code) and display each depth position by determining whether the CT values of the depth position are those of a tumor region.

In addition, instead of fixing the predetermined interval to, for example, 0.25 mm, by changing the predetermined interval using the interval adjustment section, the phased depth positions may be shifted to, for example, the borders of each layer of the wall of the large intestine. By calculating the CT values of the border positions of each layer, it is possible to precisely determine the degree of invasion into the wall of the large intestine. FIG. 4(c) illustrates phased depth positions that have been shifted to the borders of each layer.

The search management section 24 manages the planar position information of the normal region and information on the phased depth positions. Moreover, the search management section 24 manages the planar position information of a tumor region based on the planar position information of the normal region.

The search management section 24 sends a request to the second search section 26 to search for a predetermined planar position of a tumor region. The second search section 26 receives the information on the phased depth positions from the search management section 24, determines whether the CT values of the data of expanded images related to each phased depth position are the CT values of a tumor region estimated to be a tumor, and based on the determination that the CT values are those of said tumor region, searches for the deepest depth position of the tumor region. The second search section 26 sends the search results to the search management section 24. The depth calculation section 25 and the second search section 26 described above correspond to a depth-information search section that obtain the depth information of a tumor region in a lumen wall.

The search management section 24 manages the search results sent from the second search section 26. The search management section 24 sends requests to the second search section 26 to search for the phased depth positions until all of the search results of each phased depth position are sent. When all of the search results of each phased depth position are sent, the search management section 24 sends a request to the second search section 26 to search for the next planar position of the tumor region. The search management section 24 sends requests to the second search section 26 to search for the depth positions until the search results for all of the planar positions of the inner wall of the large intestine are sent.

The search management section 24 sends the search results (position information of the tumor region and information on the deepest depth position of the tumor region) of all of the planar positions of the inner wall of the large intestine to a display controller 27. The display controller 27 causes the tumor region to be identified according to color at each of the deepest depth positions of the tumor region and superimposes it on an expanded image (VGP image) to be displayed on a display section 31. By superimposing the tumor region on the expanded image and displaying it, the tumor region becomes easier to observe. Moreover, because the tumor region has been identified according to color at each of the deepest depth positions, it becomes possible to easily determine the properties and the degree of invasion of the tumor.

FIG. 6 illustrates an expanded image and a tumor region displayed by being superimposed on the expanded image. Moreover, in FIG. 6, the borderline between the tumor region at the first-phase depth position (mucous membrane) and the tumor region at the third-phase depth position (muscularis propria) is indicated with a thick line. The total number of color types used for identifying the deepest depth positions is equivalent to the total number of phased depth positions.

In addition, the identification of each of the deepest depth positions is not limited to identification according to color. The identification may use hatching patterns or other patterns, or each phased depth position may be identified by segmenting the borders.

(Operation)

Figure 8:
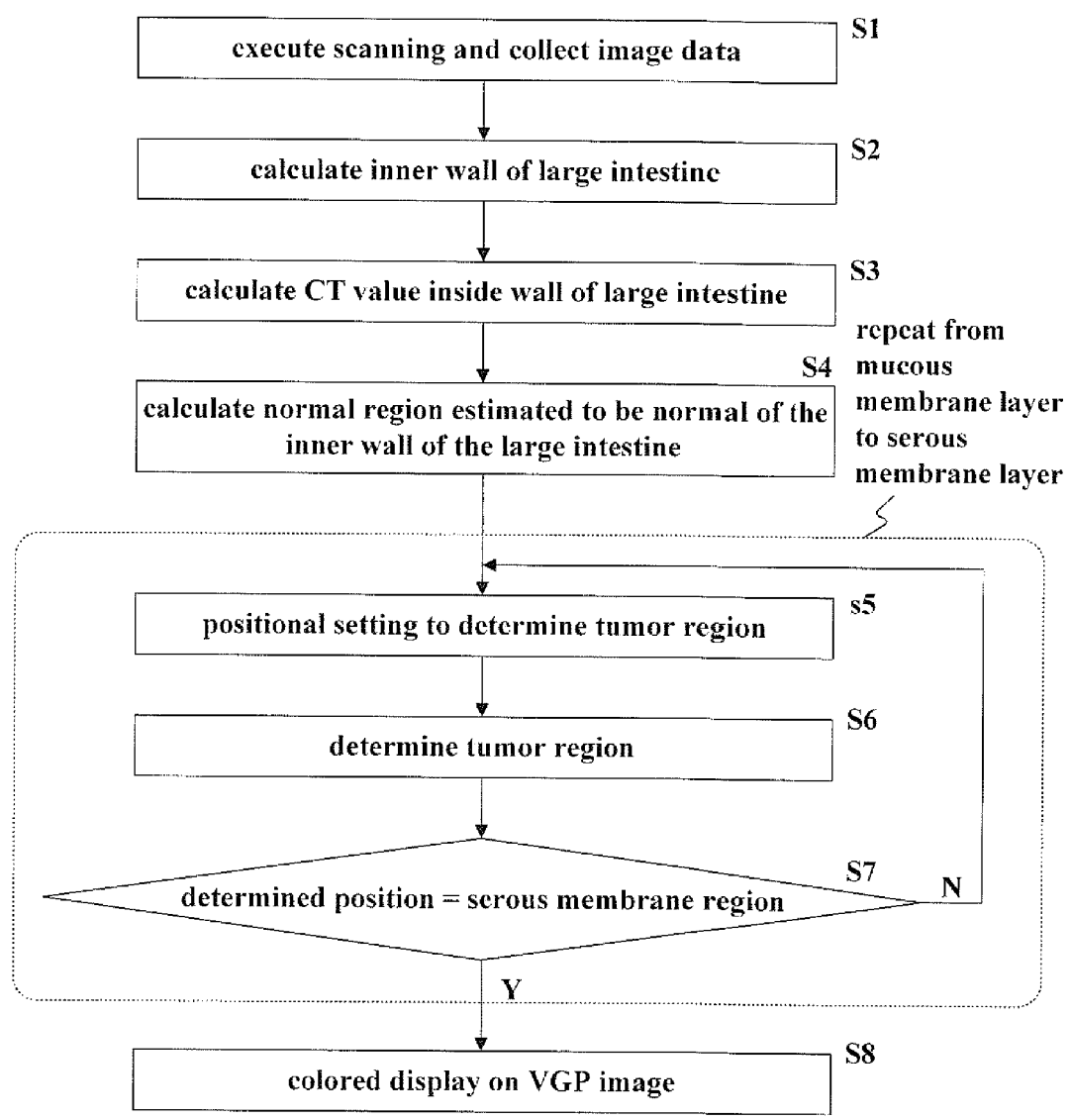
FIG. 8 is a flow chart showing a series of operations of an image display device.
Figure 9:
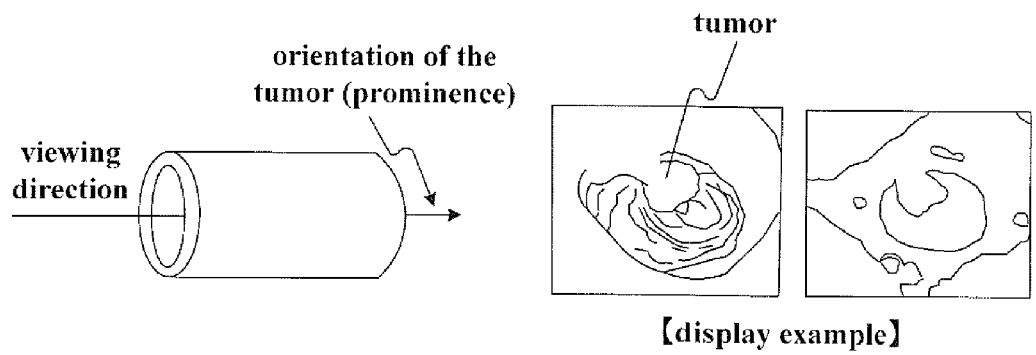
FIG. 9 is an explanatory diagram of a case of a VE display in which the orientation of a tumor is perpendicular to the viewing direction.
Figure 10:
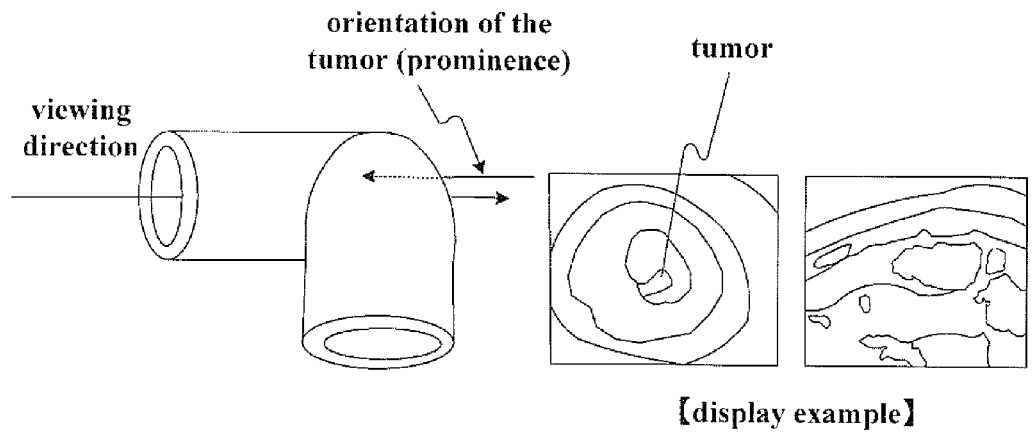
FIG. 10 is an explanatory diagram of a case of a VE display in which the orientation of a tumor runs counter to the viewing direction.

Next, a series of operations of the image display device will be described with reference to FIG. 8. FIG. 8 is a flow chart showing the procedures from calculating the position information of the inner wall of the large intestine from three-dimensional image data of a subject collected by an X-ray CT device to displaying the degree of invasion of a tumor on a VGP image.

First, in order for the lesioned part of the subject to be visualized clearly, a scan is executed as a contrast agent is administered and carbonic acid gas is injected in an X-ray CT device and image data of the subject is collected. The three-dimensional image data collected and reconstructed by the X-ray CT device is stored in the storage 11 (step S1).

Next, based on the information of the image data stored in the storage 11, the image display device automatically extracts the large intestine, generates data of an expanded image (VGP image) in which the inner wall of the large intestine is planarly expanded, and calculates the planar position information of the inner wall of the large intestine (step S2).

Next, based on the planar position information of the inner wall of the large intestine calculated in step S2, the large-intestine inner-wall calculation section 22 calculates the CT values of the interior of the wall of the large intestine (mucous membrane layer) (step S3). As the planar position information of the inner wall of the large intestine represents the inner wall surface, based on this information, the position information of the mucous membrane layer, which is the closest layer to the inner wall surface of the large intestine, is calculated, and based on the position information of the mucous membrane layer, the CT values of the mucous membrane layer are calculated.

Next, using the CT values of the interior of the wall of the large intestine (mucous membrane layer) calculated in step S3, the first search section 23 calculates the position information of a normal region estimated to be normal of the inner wall of the large intestine (step S4). Position information of a normal region of the inner wall of the large intestine is the position information of a normal region before the tumor was generated and refers to the position information on which searches for the degree of invasion of the tumor are based. As described in step S3, it is possible to determine whether a tumor has been generated based on the calculated CT values. Therefore, by connecting adjacent position information where no tumors have been generated, it is possible to calculate the position information of the normal region in the inner wall of the large intestine. The method for calculating the position information of the normal region in the inner wall of the large intestine has been described above with reference to FIGS. 3 and 4.

Next, based on the position information of the normal region of the inner wall of the large intestine calculated in step S4, the depth calculation section 25 sets the standard depth position, which is a position at a predetermined depth (0.25 mm) from the surface of the inner wall of the large intestine in the direction of the outer wall of the large intestine, and the depth calculation section 25 also sets the phased depth positions when the depth is increased in phases at a predetermined interval from the standard depth position toward the position of the outer wall of the large intestine (step S5).

Next, based on the phased depth positions set in step S5, the second search section 26 starts searches for the phased depth positions, starting from the standard depth position and proceeding in order, and determines whether the CT values related to each depth position are the CT values of a tumor region (step S6). When it is determined that the CT values related to a depth position are the CT values of a tumor region, the second search section 26 defines the current phased depth position as the deepest depth position of the tumor region.

Next, the search management section 24 judges whether the searches for all of the depth positions for each layer of the mucous membrane, the submucosal layer, the muscularis propria, and the serous membrane have been completed. If the searches for all of the depth positions have been completed (step S7: Y), the process proceeds to the following step S8. Conversely, if the search management section 24 judges that the searches for all of the depth positions have not been completed (step S7: N), it returns to step S5 to send a request to the second search section 26 to search for the following phased depth position.

If the phased depth position is below the position of the outer wall of the large intestine (serous membrane layer), the process from step S5 to step S7 is repeated, and if the phased depth position exceeds the position of the outer wall of the large intestine (serous membrane layer), the search for the deepest depth position is ended. Subsequently, the process proceeds to searching for the following planar position of the tumor region and repeats step S5 to step S7 until the phased depth position exceeds the position of the outer wall of the large intestine (serous membrane layer).

As described above, by repeating the process from step S5 to step S7 to search for the deepest depth position for each planar position of the tumor region, it is possible to obtain the deepest depth position information of all of the planar positions of the tumor region as the search results for all of the planar positions of the tumor region.

The search management section 24 sends the deepest depth position information of all of the planar positions of the tumor region to the display controller 27, and the display controller 27 identifies the tumor region at each of the deepest depth positions and superimposes it on an expanded image (VGP image) to cause the display section 31 to display it (step S8). The display controller 27 classes them by color and cause the display section 31 to display each item of deepest depth position information. As a result, it is possible to display the tumor region by identifying (classifying by color) each degree of invasion.

Next, the process of identifying and displaying the degree of invasion of the tumor region will be described. In the exemplary embodiment described above, the tumor is displayed with each degree of invasion identified (color coded) on a VGP image, and as long as colors that allow the differences between each layer to be easily identified are used for the display, there are no particular limitations for the colors. However, because the tumor is displayed with each degree of invasion identified (color coded), it is necessary to identify the deepest depth position reached by the tumor (the deepest layer) and each layer before the layer of the deepest depth position with different colors and display the layers to prevent the user from becoming confused.

The exemplary embodiment described above includes a function for calculating the CT values within the wall of the large intestine and for color coding the degree of invasion of the tumor on the VGP image to display the tumor. In addition to this function, a function for displaying an MPR cross-section position over the VGP image and displaying an MPR image of that cross section may also be included.

Figure 7:
FIG. 7 is a diagram of an MPR image obtained by sectioning an expanded image at an MPR cross-section position.

FIG. 6 illustrates an MPR cross-section position, and FIG. 7 illustrates an MPR image. With this function, it becomes possible to confirm the actual CT image (MPR image) of the color-coded and displayed tumor region and to measure the CT values as necessary.

Moreover, rather than fixing the MPR cross-section position, the user may specify the cross-section position using a pointing device, such as a mouse, a keyboard, or a trackball, and change the cross-section position by, for example, dragging the mouse. As a result, it becomes possible to display the MPR image of an arbitrarily changed cross-section position.

Moreover, the exemplary embodiment has been described based on the example of a CTC (CT Colonography) using an X-ray CT device, but this invention may be used with an MRC (MR Colonography) using an MRI device. Although CTCs involve problems such as pain and X-ray bombardment forced on the patient during pretreatment and testing, MRCs allow for these problems to be reduced and can be expected to provide MRC images with higher definition.

Furthermore, the image display device related to the exemplary embodiment has been composed as a separate unit from the X-ray CT device, but it may be composed by being integrated with an X-ray CT device or an MRI device.

Furthermore, in the exemplary embodiment, based on the image data of the large intestine, data of an expanded image (VGP image) in which the inner wall of the large intestine is planarly expanded is generated and the normal region is searched for using the pixel values of the data of the expanded image, but the normal region may be searched for directly from the image data. In this case, the display controller 27 causes the tumor region to be displayed by superimposing it on a three-dimensional image of the large intestine.

Furthermore, said exemplary embodiment includes steps in which the second search section 26 starts the searches for the phased depth positions in order from the standard depth position and determines whether the CT values related to each depth position are the CT values of the tumor region, but the section search section 26 may perform the searches for the phased depth positions in order starting from the outer wall of the large intestine (serous membrane) toward the standard depth position.

Furthermore, in the exemplary embodiment, by using color information as the deepest depth position information displayed by being superimposed on the expanded image (VGP image), it is possible to display the tumor region by identifying (color coding) each degree of invasion, but the invention is not limited to this, and for example, it may be made possible to directly display the depths of invasion of the tumor region using numerical values.

What is claimed is:

1. An image display device comprising:
    a storage section configured to store three-dimensional image data including a lumen;
    a tumor-region search section configured to detect a tumor region in the lumen and to determine a normal region where an inner wall of the lumen is estimated to be normal at respective positions of the inner wall of the lumen from pixel values of the image data of the normal region including the lumen;
    a depth-information search section configured to determine a standard depth position, which is a position at a predetermined depth in the direction toward the outer wall of the lumen from the inner wall surface of the lumen, based on the normal region, and to determine the depth information of the tumor region in the wall of the lumen based on the standard depth position;
    a display section; and
    a display controller configured to cause the display section to display the depth information along with an image of the lumen.

2. The image display device of claim 1, wherein:
    the tumor-region search section comprises a first search section configured to search for the normal region from the pixel values of the image data of the region including the lumen, based on the pixel values of the normal region where the inner wall of the lumen is estimated to be normal at respective positions of the inner wall of the lumen;

the depth-information search section comprises a depth calculation section configured to determine the phased depth positions when the depth from the standard depth position to the position of the outer wall of the lumen is increased in phases at a predetermined interval;

the tumor-region search section further comprises a second search section configured to receive information of the phased depth information from the depth calculation section, to determine whether the pixel values of the image data related to each of the phased depth positions are the pixel values of the tumor region estimated to be a tumor, and, based on the determination that the pixel values are those of the tumor region, to search for a deepest depth position of the tumor region at each position of the inner wall of the lumen; and the display controller causes, based on the tumor region searched at each position of the inner wall of the lumen and on information on the deepest depth positions of the tumor region, the tumor region at each position of the inner wall of the lumen to be identified for each of the deepest depth positions of the tumor region, and causes the tumor region to be superimposed on an image of the lumen to be displayed on the display section.

3. The image display device of claim 1 or 2, wherein: the image of the lumen is an expanded image in which the inner wall of the lumen is planarly expanded; and the display controller is configured to cause the tumor region to be superimposed on the expanded image and displayed.

4. The image display device of claim 2, wherein the depth calculation section comprises an interval adjustment section configured to change the predetermined interval.

5. The image display device of claim 2, wherein the display controller is configured to cause the image of the tumor region at each of the deepest depth positions to be identified according to color.

6. The image display device of claim 1 or 2, wherein a medical imaging device that collects the image data is either an X-ray CT device or an MRI device.

7. An image display method comprising:

generating data of an expanded image in which the inner wall of the lumen is planarly expanded, based on image data of a region including a lumen;

searching for the normal region from the pixel values of the data of the expanded image at a planar position of the inner wall of the lumen, based on the pixel values of a normal region where the inner wall of the lumen is estimated to be normal;

determining a standard depth position, which is a position at a predetermined depth in the direction toward the outer wall of the lumen from the inner wall surface of the lumen, and determining the phased depth positions when the depth from the standard depth position to the position of the outer wall of the lumen is increased in multiple phases at a predetermined interval;

receiving information on the phased depth positions for each planar position of the inner wall of the lumen, starting a search for the phased depth positions in order from the standard depth position, and, if the phased depth position is equal to or below the position of the outer wall of the lumen, determining whether the pixel values of the data of the expanded image related to the phased depth position are the pixel values of a tumor region estimated to be a tumor and defining the current phased depth position as the deepest depth position of the tumor region when the pixel values are determined to be those of the tumor region, or, if the phased depth position exceeds the position of the outer wall of the lumen, ending the search for the deepest depth position; and identifying the tumor region at each planar position of the inner wall of the lumen for each of the deepest depth positions of the tumor region, and superimposing the tumor region on the expanded image to be displayed, based on the tumor region searched at each planar position of the inner wall of the lumen and on information on the deepest depth positions of the tumor region.

8. The image display method of claim 7, wherein: the image of the lumen is an expanded image in which the inner wall of the lumen is planarly expanded; and during the superimposing, the tumor region is superimposed on the expanded image to be displayed.

9. The image display method of claim 7 or 8, comprising changing the predetermined interval using an interval adjustment section.

10. The image display method of claim 7 or 8, wherein the image of the tumor region at each of the deepest depth positions is identified according to color.

11. An X-ray CT device comprising an image display device, the image display device comprising:

a storage section configured to store three-dimensional image data including a lumen;

a tumor-region search section configured to detect a tumor region in the lumen and to determine a normal region where an inner wall of the lumen is estimated to be normal at respective positions of the inner wall of the lumen from pixel values of the image data of the normal region including the lumen;

a depth-information search section configured to determine a standard depth position, which is a position at a predetermined depth in the direction toward the outer wall of the lumen from the inner wall surface of the lumen, based on the normal region, and to determine the depth information of the tumor region in the wall of the lumen based on the standard depth position;

a display section; and a display controller configured to cause the display section to display the depth information along with an image of the lumen.

* * * * *